US008370531B1

(12) United States Patent
Foti

(10) Patent No.: US 8,370,531 B1
(45) Date of Patent: *Feb. 5, 2013

(54) METHOD AND SYSTEM FOR ACCESSING OBJECTS DEFINED WITHIN AN EXTERNAL OBJECT-ORIENTED ENVIRONMENT

(75) Inventor: David A. Foti, Tolland, CT (US)

(73) Assignee: The MathWorks, Inc., Natick, MA (US)

( * ) Notice: Subject to any disclaimer, the term of this patent is extended or adjusted under 35 U.S.C. 154(b) by 1640 days.

This patent is subject to a terminal disclaimer.

(21) Appl. No.: 11/502,930

(22) Filed: Aug. 11, 2006

Related U.S. Application Data

(63) Continuation of application No. 09/518,288, filed on Mar. 3, 2000, now Pat. No. 7,181,745.

(51) Int. Cl.
*G06F 3/00* (2006.01)
*G06F 9/455* (2006.01)
*G06F 9/44* (2006.01)

(52) U.S. Cl. .............................. 709/310; 718/1; 717/118
(58) Field of Classification Search .................. 719/310; 718/1; 717/118
See application file for complete search history.

(56) References Cited

U.S. PATENT DOCUMENTS

| | | | |
|---|---|---|---|
| 5,307,499 A | 4/1994 | Yin | |
| 5,469,574 A | 11/1995 | Chang et al. | |
| 6,009,517 A * | 12/1999 | Bak et al. | 712/245 |
| 6,011,916 A * | 1/2000 | Moore et al. | 717/104 |
| 6,061,721 A | 5/2000 | Ismael et al. | |
| 6,230,160 B1 | 5/2001 | Chan et al. | |
| 6,269,373 B1 * | 7/2001 | Apte et al. | 1/1 |
| 6,282,699 B1 | 8/2001 | Zhang et al. | |
| 6,289,395 B1 | 9/2001 | Apte et al. | |
| 6,453,342 B1 * | 9/2002 | Himmel et al. | 709/213 |
| 6,578,191 B1 | 6/2003 | Boehme et al. | |
| 6,585,779 B1 * | 7/2003 | Becker | 715/237 |
| 6,662,236 B1 | 12/2003 | Apte et al. | |
| 6,845,448 B1 * | 1/2005 | Chaganti et al. | 713/166 |
| 6,877,163 B1 | 4/2005 | Jones et al. | |
| 6,959,307 B2 * | 10/2005 | Apte | 1/1 |
| 2002/0069399 A1 * | 6/2002 | Miloushev et al. | 717/108 |
| 2004/0111730 A1 * | 6/2004 | Apte | 719/330 |

OTHER PUBLICATIONS

PAR Government Systems Corporation, Crest Dara Library, Mar. 15, 1995.*
AWT Enhancements, 1996 Sun Microsystem.
Gay, David M., "Symbolic-Algebraic Computations in a Modeling Language for Mathematical Programming," Proceedings from seminar on Systematic-algebraic Methods and Verification Methods—Theory and Applicatons, Nov. 21-26, 1999, Schloss Dagstuhl, Germany.
Halepota, Al Sadiq ul Amin M. Madani et al, "A Dynamic Docucentric Environment for System Design Support," (1998).
Hartmut Pohlheim, Genetic and Evolutionary Algorithm Toolbox for use with MATLAB, Jul. 1997.
IBM Technical Disclosure Bulletin, "Generating Event Adapters to Facilitate Connections Between Java Beans," vol. 41(1):125-128 (1998).
Ma, Master of disguises: Marketing JavaBeans look like ActiveX controls, 1998.
Moore, John Henry, "Microsoft's New, Improved Proxy Server," *Windows IT Pro*, Dec. 1997, p. 1-3.

(Continued)

*Primary Examiner* — Lechi Truong
(74) *Attorney, Agent, or Firm* — Nelson Mullins Riley & Scarborough LLP

(57) ABSTRACT

A method, system and apparatus, including a computer program apparatus, implementing techniques for dynamically creating a class and an object in an external computing environment. The method, system and apparatus allow the creation of an adapter class, capable of implementing a listener interface, during runtime.

30 Claims, 5 Drawing Sheets

OTHER PUBLICATIONS

Samir, Gehani, "A java based Framework for Explicitly Partioning Applications into Distributable Units," Thesis submitted in partial satisfaction of the requirements for the degree of Master of Science in the Department of Computer Science of the University of San Francisco, 1997.

Tarjan, Robert, "Enumeration of the Elementary Circuits of a Directed Graph," SIAM J. Comput., vol. 2(3):211-216 (1973).

Tarjan, Robert, "Depth-First Search and Linear Graph Algorithms," *SIAM J. Comp.*, 1(2):146-160 (1972).

Tiernan, James C., "An Efficient Search Algorithm to Find the Elementary Circuits of a Graph," *Communications of the ACM*, vol. 13(12):722-726 (1970).

Weinblatt, Herbert,"A New Search Algorithm for Finding the Simple Cycles of a Finite Directed Graph," *Journal of the Association for Computing Machinery*, 19(1):43-56 (1972).

Lundh, Fredrik, "An Introduction to Tkinter," (1999).

Flanagan, David, "JAVA in a Nutshell, A Desktop Quick Reference, 3rd Edition" O'Reilly & Associates, Inc., Mary Anne Weeks May Ed. (1999).

Eckstein, Robert et al., "JAVA Swing," O'Reilly & Associates, Mike Loukides, Ed. (1998).

Küçük, Bülent et al., "Connecting Incompatible Black-Box Components Using Customizable Adapters," *Lecture Notes on Computer Science*, vol. 1543:147-148 (1998).

Küçük, B. et al., "Customizable Adapters for Blackbox Components," Third International Workshop on Component-Oriented Programming (WCOP'98), Brussels, Belgium (1998).

MathWorks, "Matlab, The Language of Technical Computing, Application Program Interface Reference, Version 5," *The MathWorks, Inc.* (1998).

Nierstrasz, Oscar et al., "Object-oriented Software Composition," Prentice Hall (1995).

Smith, Glenn et al., "A Case for Meta-Networking: Projecting CORBA Meta-data into COM," *Proceedings Technology of Object-Oriented Languages. Tools, IEEE Comput. Soc.* pp. 242-253 (1998).

Thatté, Satish R., "Automated Synthesis of Interface Adapters for Reusable Classes," *Proceedings of the 21st ACM SIGPLAN-SIGACT Symposium on Programming Languages*, pp. 174-187 (1994).

Walrath, Kathy et al., "The JFC Swing Tutorial, A Guide to Constructing GUIs," Sun Microsystems, Inc., Addison-Wesley (1999).

*The MathWorks, Inc.* vs. *Comsol AB and Comsol, Inc.*, "Invalidity Contentions of Defendants Comsol AB and Comsol, Inc., Regarding '745 Patent Pursuant to Local Patent Rule 3-3," No. 6:06-CV-334 LED.

*The MathWorks, Inc.* vs. *Comsol AB and Comsol, Inc.*, "Amended Invalidity Contentions of Defendants Comsol AB and Comsol, Inc., Regarding '745 Patent Pursuant to Local Patent Rule 3-3," No. 6:06-CV-334 LED.

Java AWT v.1.1.8 source code (1996) saved to CD.

Rhino Ver. 1.4R3 source code (1999) saved to CD.

Python Ver. 1.5.2/Tkinter (1999) saved to CD.

JPython v.1.1 source code (1999) saved to CD.

JPython v.1.1 User documentation (1999) saved to CD.

\* cited by examiner

METHOD AND SYSTEM FOR ACCESSING OBJECTS DEFINED WITHIN AN EXTERNAL OBJECT-ORIENTED ENVIRONMENT

RELATED APPLICATIONS

This application is a Continuation of U.S. patent application Ser. No. 09/518,288 which was filed on Mar. 3, 2000, and which issued as U.S. Pat. No. 7,181,745 on Feb. 20, 2007.

TECHNICAL FIELD

The invention relates generally to interfacing computing environments.

BACKGROUND

In general, a computing environment represents the state of the computer and determines the kind of programs that can execute on the computer and how the programs may be run. To an extent, the computing environment is dependent upon the computer's operating system, and the operating system may support different environments. A computer may support two or more computing environments at the same time. Each environment is "external" to the other in the sense that they are logically separate, i.e., programs, classes and objects defined in one of the environments are not readily accessible in the other environment.

Either environment may be an interpretive environment or a compiled environment. An interpretive computing environment is one in which a pending high-level instruction is converted into an intermediate form, which the computer then converts to machine language and executes before turning to the net high-level instruction. Another environment may require compiling, rather than interpreting, the high-level instructions. Compiling entails translating a collection or group of high-level instructions into a lower-level language. Some compilers translate the collection of high-level instructions into machine language, which a computer may then execute. Other compilers translate the collection of high-level instructions into an intermediate form. These instructions in intermediate form may then be executed in order by an interpreter, or may be compiled as a group again for execution.

A particular environment need not be strictly interpretive or compiled, but may share attributes of both kinds of environments. In general, compiled programs run faster than interpreted programs, but are often more difficult to develop and debug. Interpreted programs are generally easier to debug and correct, but run more slowly than compiled programs.

An application written using a high-level computer programming language, such as C or C++, ordinarily is compiled prior to execution. The application itself, however, may behave like an interpreter, interactively carrying out instructions as each instruction is input by a user. The mathematical application MATLAB™ by MathWorks, Inc. of Natick, Mass., for example, is a compiled program that may behave like an interpreter. MATLAB provides a technical computing environment that combines numeric computation, advanced graphics and visualization, and a high-level programming language. The high-level programming language provides flow-control constructs and includes a variety of operators for performing numerical analysis, string manipulation, and graphical user interface (GUI) design. A MATLAB program generally executes instructions as each instruction is given by the user. A MATLAB user may, for example, define a square matrix with a single command. Once the matrix is defined, the user may manipulate the matrix, using one command to find its inverse, another command to find its transpose, or another command to learn its determinant. Each command is carried out as it is given, and MATLAB allows users to receive an acknowledgment that each command has been carried out. MATLAB does not need to be recompiled after every command. Accordingly, a MATLAB user may be said to be operating in an interpretive computing environment.

Other examples of programs where users may enter instructions interactively include VisualBasic™, SmallTalk, LISP, Mathematica™, and IDL™.

A modern and widely-used computing environment is the Java environment. The Java environment supports object-oriented programming in which reusable software components called "objects" form the building blocks of a computer program.

In the Java environment, programs written in the high-level Java language (also called the "source code") are compiled by the Java compiler, creating a lower-level version of the program in the form of "bytecodes." Bytecodes represent a formatted string of numbers, corresponding to an intermediate form of the program between the high-level Java language understood by people and the low-level machine language understood by computers. Bytecodes are converted into machine code by a machine code generator such as a "Java interpreter" or a "JIT (just-in-time) compiler."

The bytecodes represent a form of the program recognized by the Java virtual machine. In general, a "virtual machine" is an abstract computing machine. Computer programs are essentially lists of instructions used to control a machine, and the instructions must be converted into the language of that machine before the instructions may be carried out. In some cases, the instructions control a hardware-based or "real" machine, such as a personal computer. Instructions to a "real" machine ordinarily conform to the native language of the hardware itself. In other cases, the instructions control a software-based computer program called a "virtual machine," which in turn controls a real machine. Instructions to a virtual machine ordinarily conform to the virtual machine language. For the Java virtual machine, the virtual machine language is in bytecodes.

The Java virtual machine is only one of many virtual machines. Any interpreted language may be said to employ a virtual machine. The MATLAB program, for example, behaves like an interpretive program by conveying the user's instructions to software written in a high-level language, rather than to the hardware. An advantage of a virtual machine is that it is more specialized than the general-purpose hardware of a "real" machine. This specialization permits quick transformation from high-level language to bytecodes, often with fewer demands placed upon the computer hardware than would be made by a fully compiled language.

In an object-oriented computing environment, such as the Java environment, "objects" are modules of computer code that specify the data types of a data structure, and also the kinds of operations (or "methods") that will be permitted to be applied to the data structure. A "class" may be thought of as a prototype that defines the data structures and methods common to all objects of a certain kind; thus, an object may be of a particular class. "Instantiation" of a class creates an object of that class. Classes that are in general referred to as Java "beans" (JavaBeans is a registered trademark of Sun Microsystems, Inc.), are of particular interest. Java beans are reusable software modules written in the Java language. To qualify as a Java bean, a class is written to follow a specific convention. Importantly, a Java bean supports "introspection," meaning that the object-oriented computing environment may be queried about the bean, its properties, methods and events. This determination may take place while the Java program is executing, i.e., during "runtime."

As used below, a reusable object-oriented class that supports introspection during runtime may be referred to as a "bean," even if the class may not strictly qualify as a Java bean. The term "bean" will be used below more generally than the term is used in Java, and will include but not be limited to Java beans.

Under some circumstances a user may wish to combine the benefits of both environments. A user working in one computing environment may wish to take advantage of a particular module of computer code that operates exclusively in a second, object-oriented, computing environment.

SUMMARY OF THE INVENTION

In general, the invention concerns techniques by which a computer program operating in one computing environment may utilize objects in an external object-oriented computing environment.

One aspect of this invention provides a method by which classes and objects may be defined during runtime in an external object-oriented computing environment. The method comprises calling, from a computer program running in a first computing environment, a class in a second external object-oriented computing environment, introspecting the object-oriented computing environment to determine an interface supported by the called class, defining an adapter class to implement the interface of the called class and instantiating an adapter object as a function of the adapter class.

In another aspect, the invention features a computer program product, tangibly stored on a computer-readable medium, for invoking a method defining classes and objects in an object-oriented computing environment at runtime.

In another aspect, the invention features a system, comprising a first computing environment supported by a computer and a second computing environment supported by a computer. The second computing environment is external to the first computing environment, and is an object-oriented computing environment. The system further includes a compiled bean class in the second computing environment, a bean object instantiated from the compiled bean class, a means for dynamically creating an adapter class in the second computing environment, the adapter class capable of implementing an interface of the bean class, and an adapter object instantiated from the adapter class.

Other features and advantages of the invention will become apparent from the description, the drawings, and the claims.

DETAILED DESCRIPTION

Figure 1:
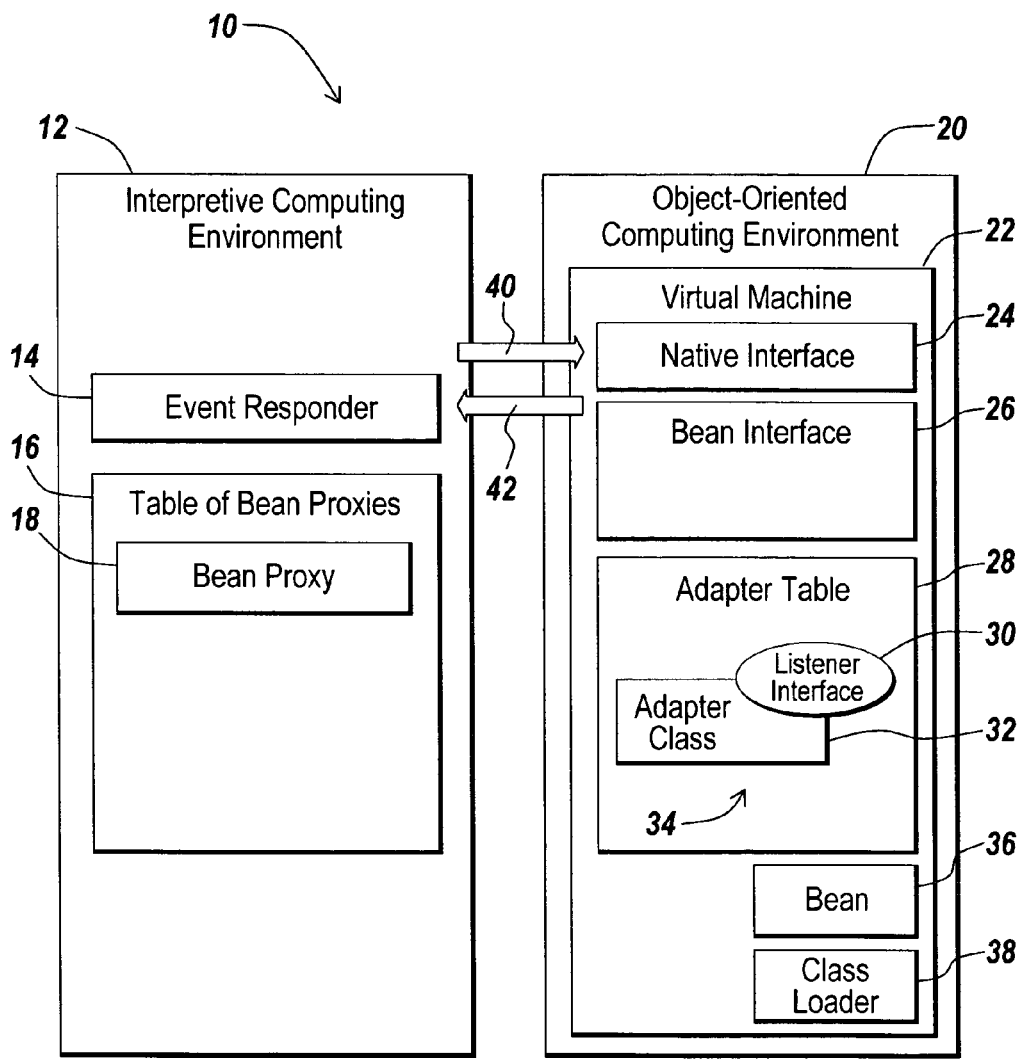
FIG. 1 is a block diagram providing a high-level overview of a system in which an interpretive computing environment interacts with an external object-oriented computing environment.

This application concerns techniques by which a computer program operating in a first computing environment accesses objects in an external object-oriented computing environment. The computer program in the first environment and the object in the second environment may be written in different computer languages. The first computing environment may be, for example, an interpretive computing environment, but it is understood that the first computing environment need not be strictly interpretive. Many aspects of the invention will be described with the computing environments being an interpretive computing environment, but this is for ease of illustration; compiled programs may employ similar methods and may be within the scope of the invention. Because the Java object-oriented computing environment is well-understood and well-documented, many aspects of the invention will be described in terms of Java and Java-based concepts, but the Java and Java-based concepts are used for ease of explanation. The invention is not limited to interactions with a Java object-oriented computing environment.

An object-oriented computer program such as a Java bean may offer many advantages to a computer user. A bean is a reusable component of computer code, that is, it is a module that has already been created to perform a function. A bean is generally a class, and by instantiation the bean can be used and reused in larger applications. Furthermore, a bean is portable and platform-independent, meaning the bean class and the instantiated bean objects can operate on virtually any computer that can support the Java virtual machine. In addition, a bean supports "introspection," meaning that the object-oriented computing environment may be queried about the bean, its properties and methods.

A bean may define one or more events. An "event" is a pre-defined action or occurrence that happens in or to the bean. Examples of an event may include a user's interaction with a Java-based GUI, or a reading on a remote sensor, or the expiration of a timer. The bean may send messages, or "fire the event," to other Java objects that have registered an interest in that event. A class of Java objects may register an interest in an event by implementing an interface called a "listener" interface. The class that implements a listener interface may then perform one or more functions in reaction to the bean's message, i.e., invoke methods upon occurrence of the event. Multiple listener interfaces may receive events from a single bean, and different methods of the interfaces may be invoked in reaction to events.

An computer program running in a first computing environment may not be able to take advantage of the features of beans, if the beans exist in a second computing environment external to the first computing environment. The program in the first computing environment may not be recognized as a class or an object in the external object-oriented computing environment. In general, only classes of objects that implement listener interfaces may be registered to listen for an event. In addition, an interactive program running inside an interpretive computing environment responds to commands while the program is running, i.e., during runtime. A bean running inside the object-oriented computing environment and a class that implements a listener interface are compiled prior to execution, and are not compiled during runtime. One method for a program running inside an interpretive computing environment to interact with a compiled program is, at each interaction, to stop execution of the compiled program, modify the stopped program, recompile the stopped program, and execute it anew. This method is extremely inefficient. Moreover, because of the diversity of listener interfaces and associated methods, developing classes to implement all possible interfaces is difficult and impractical.

The invention provides a way for an interactive computer program running in one computing environment to register its interest in an event with a bean defined within an external computing environment, i.e., to associate a resultant action in the computing environment with an event fired by the external environment. The invention allows for an interactive program to take advantage of a bean by creating an adapter class in the object-oriented computing environment during runtime. The invention includes a class, referred to herein as ClassFile. Like other Java classes, ClassFile may be instantiated to create an object of class ClassFile. The object of class ClassFile may then operate to build a new adapter class. This new adapter class, when instantiated, creates an adapter object.

The ClassFile class may be compiled with the rest of the Java code. The adapter class, by contrast, need not be compiled with the rest of the Java code, and may in effect be added into the Java environment at runtime. The invention avoids compiling the adapter class by building the adapter class using bytecodes, rather than by building the adapter class in a high-level source code language. After the bytecodes are "loaded" (placed into memory) during runtime by a class loader, the Java interpreter will recognize the bytecodes. The bytecodes would be indistinguishable from bytecodes that resulted from compiling, and may thereafter be executed by a machine code generator. During execution, an adapter class object may be instantiated. The adapter class implements a listener interface, and the instantiated adapter class object may thus be registered to listen to an event that may be fired by a bean.

FIG. 1 is a block diagram providing a high-level overview of a system 10 in which an interpretive computing environment 12 interacts with an object-oriented computing environment 20. A single computer (not shown in FIG. 1) is capable of supporting both environments 12, 20 simultaneously. The object-oriented environment 20 is represented as external to the interpretive computing environment 12. The interpretive computing environment 12 need not support strictly interpretive programs, and may actually support object-oriented programs. The object-oriented environment 20 is external to the interpretive computing environment 12, however, because the object-oriented environment 20 does not recognize any objects in the interpretive computing environment 12. For purposes of illustration, it is assumed that programs operating in the interpretive environment behave in an interactive fashion. Furthermore, it is assumed for purposes of illustration that computer programs operating in the object-oriented environment 20 ordinarily must be compiled before they can be executed. These assumptions are only for purposes of illustration and are not necessary to practice the invention.

An interactive interpretative program may operate in the interpretive computing environment 12. A user running the interpretative program may command the interpretative program to employ an object of a particular class, such as a bean. The bean class itself 36 resides in the object-oriented computing environment 20. Upon receipt of a command to employ a bean, the interpretive computing environment 12 employs a bean proxy 18, which serves the function of the bean in the interpretive computing environment 12, even though the bean proxy 18 is not the bean itself 36. The interpretative program may consult a table of bean proxies 16 to determine whether the desired bean proxy has already been generated. If the desired bean proxy has not already been generated, the interpretative program may generate one, and may list the generated bean proxy within the table of bean proxies 16. The table of bean proxies 16 may be in many forms, such as in the form of a hash table.

When, in the interpretive computing environment 12, a command is first encountered to employ or "call" a bean 36 in the object-oriented computing environment 20, a bean proxy 18 is generated in the interpretive computing environment 12. In addition, an adapter class 32 is created in the object-oriented computing environment 20 to implement the interface of the bean 36. If the bean 36 employs more than one interface, additional adapter classes may be created to implement each interface; for ease of illustration, it will be assumed that the bean supports only one interface and therefore only one adapter class 32 is created.

To generate the bean proxy 18 and adapter class 32, information about the interfaces and events supported by the bean 36 must be obtained. A message 40 may be sent from the interpretive computing environment 12 to the object-oriented computing environment 20. The message may include the name of the bean 36 being called by the user, along with an identifier for the bean 36 assigned by the interpretative program. Ordinarily the object-oriented computing environment 20 receives a message 40 from the interpretive computing environment 12 through a native interface 24. In the Java virtual machine, the Java native interface acts as a bridge between Java and other high-level languages, such as C and C++.

Upon receipt of the message 40 by the native interface 24, the object-oriented computing environment is interrogated to determine information about the bean 36. This interrogation is sometimes called "introspection." Introspection will be used to discover what events the bean 36 supports, what listener interfaces the bean 36 employs, and how the events and listener interfaces are related. It may be possible, for example, for a set of several events to trigger a single particular listener interface. Data obtained by introspection may then be used to generate an adapter class 32 to implement a listener interface 30. One adapter class may be generated for each listener interface supported by a bean 36.

Figure 2:
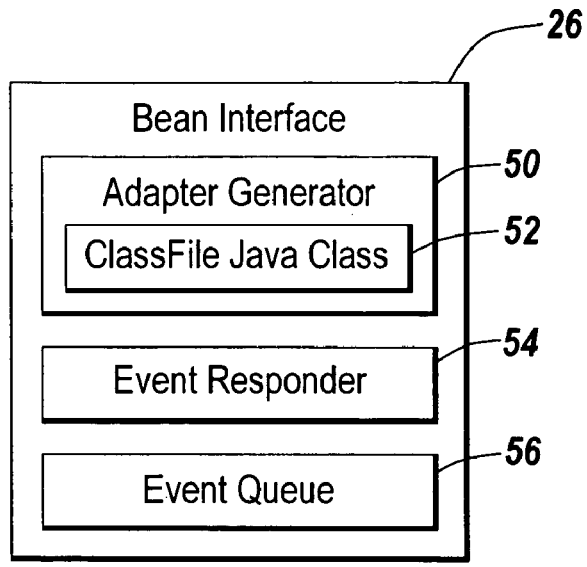
FIG. 2 is a block diagram providing a more detailed overview of a component introduced in FIG. 1.

The introspection may be performed by the bean interface 26, depicted in FIGS. 1 and 2. The data obtained by introspection may be used by the adapter generator 50. The adapter generator 50 instantiates an object of the ClassFile class 52 for each listener interface discovered by introspection. Each object of the class ClassFile employs methods of the ClassFile class 52 dynamically to create a new adapter class to implement a particular listener interface. The general process for doing so will be described in more detail below.

Figure 3:
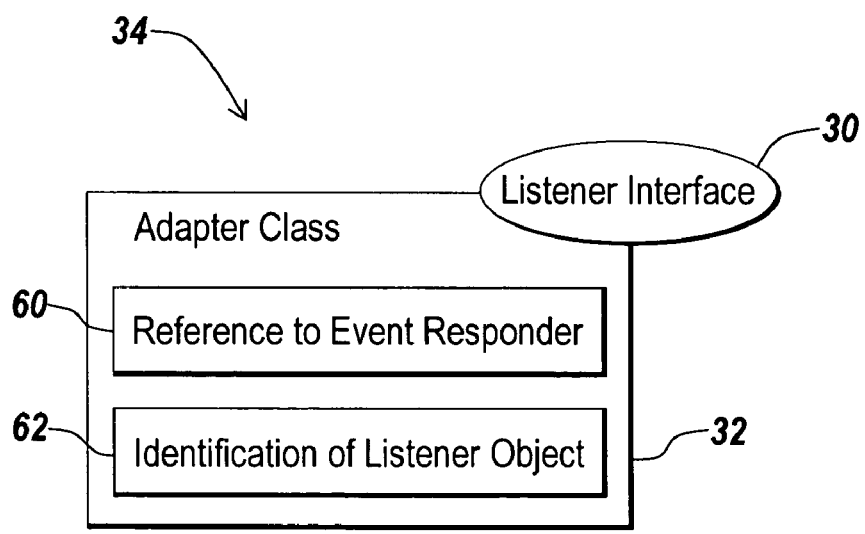
FIG. 3 is a block diagram providing a more detailed overview of a component introduced in FIG. 1.

FIG. 1 shows an adapter-implementing-interface combination 34. The combination 34 comprises the created adapter class 32 and the listener interface 30 implemented by the created adapter class 32. The adapter-implementing-interface combination 34 may be recorded in an adapter table 28, such as a hash table. The bean interface 26 may consult the adapter table 28 to determine whether a desired adapter exists and may be re-used, or whether an adapter must be created anew. FIG. 3 shows additional features of adapter-implementing-interface combination 34. An adapter object created by instantiation of the adapter class 32 may have the capability to store data. The stored data may include a number that identifies the listener interface 62. The stored data may also include a reference to an event responder 60. The reference to event responder 60 will ordinarily refer to the Event Responder 54 within the bean interface 26.

The newly created adapter class 32 may be loaded into memory during runtime by a class loader 38. The adapter class 32 will consist of bytecodes, rather than Java source code. The Java machine code generator (not shown) may then execute the bytecodes. During execution, a bean class object and an adapter class object may be instantiated. The adapter class implements a listener interface and the instantiated adapter class object may thus be registered to listen to an event that may be fired by the bean object. The bean object is instantiated when its constructor is invoked by a command from the interpretive computing environment 12.

Upon the occurrence of an event, the bean object fires the event, and the object of the adapter class will be notified. Firing the event causes messages to be sent to objects that have registered an interest in that event. Because the object of the adapter class 32 implements the listener interface 30 and the object has registered an interest in the event, the object of the adapter class 32 will receive a message when the bean object fires the event.

Upon receipt of a message, the object of the adapter class 32 relays information about the event and the listener interface to the Event Responder 54. The object of the adapter class 32 uses the reference data in storage 60 to determine where to relay the information.

The Event Responder 54 may place data structures containing information about the event into the Event Queue 56, shown in FIG. 2. The Event Responder 54 may also send a message 42 to an Event Responder 14 in the interpretive computing environment 12. Message 42 may be conveyed using the underlying message structure of the computer's operating system.

The Event Responder 14 in the interpretive computing environment 12 may then respond to the event. The Event Responder 14 in the interpretive computing environment 12 may, for example, adjust the graphics display or notify the user that the event in question has taken place. From the user's point of view, it will appear as though the interactive program has smoothly used a bean to carry out a desired function. The Event Responder 14 may also send a query to the object-oriented computing environment 20 for more information about the event.

Figure 4:
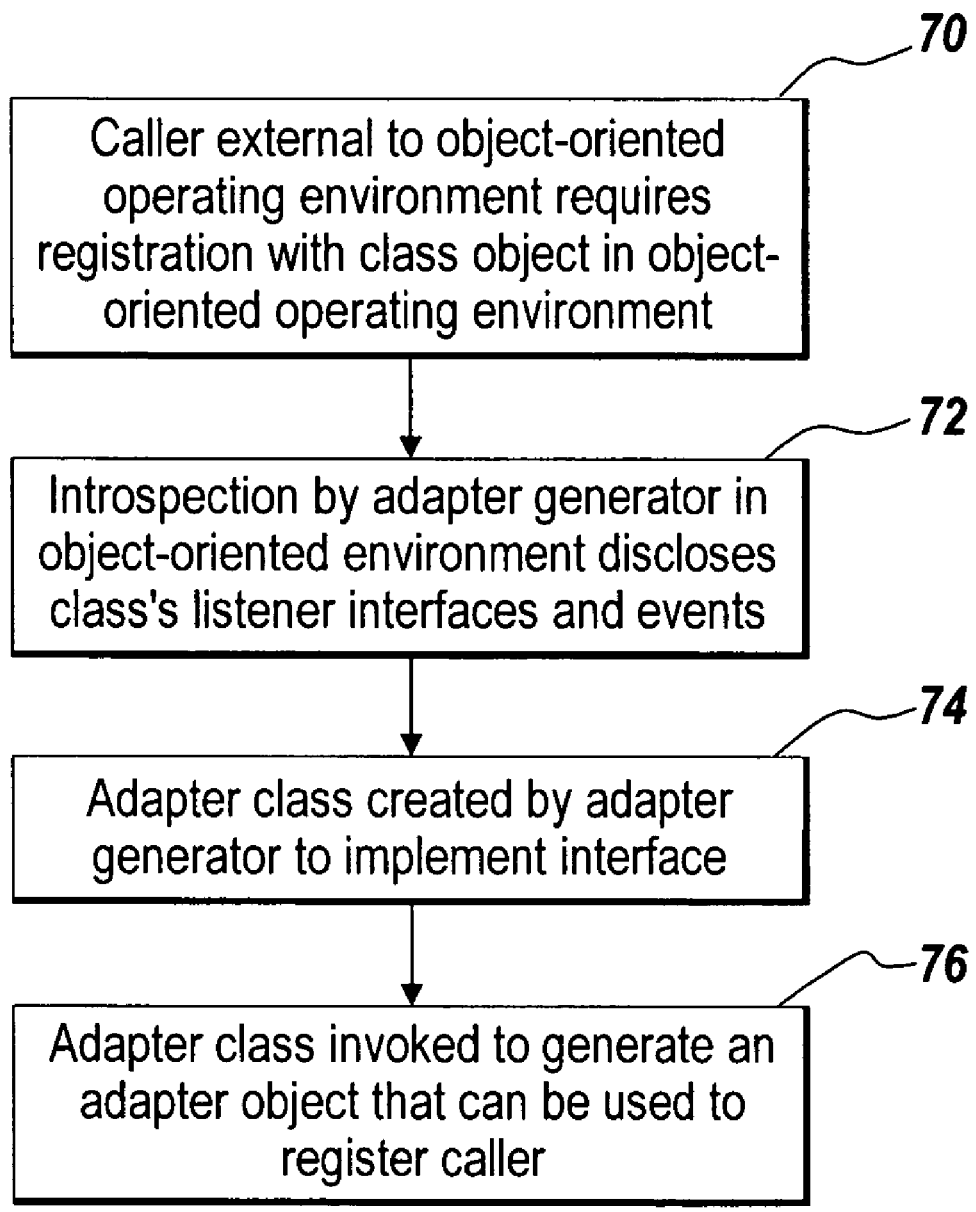
FIG. 4 is a flowchart illustrating a general embodiment of a method in accordance with an embodiment of the invention.

FIG. 4 is a flowchart illustrating one embodiment of a method for implementing the techniques of the invention. The flowchart assumes a simple case where a single listener interface adapter, implementing a bean's sole listener interface, is generated dynamically. For purposes of illustration, many of the concepts will be presented in terms of Java, but the concepts are not necessarily limited to the Java environment. The process begins when a program running in the interpretive environment 12 entails an instruction to register with an object (such as an object of a bean class 36) in the external object-oriented computing environment 20 (step 70). This results in a call 40 to the object-oriented computing environment 20. The object-oriented computing environment 20 is queried about the bean class 36, its listener interfaces and supported events (step 72). In other words, introspection is used to obtain information about the bean class 36 (the bean object itself may be instantiated at any convenient point). Using this information, the adapter generator 50 creates an adapter class 32 dynamically (step 74). This adapter class 32 implements the listener interface 30. The adapter class 32 can be used to instantiate an' adapter object to be registered as a listener on an object of the bean class (step 76). The adapter object is able to communicate messages 42 concerning an event to the calling interactive program.

The adapter object may be instantiated only after the external application executing within environment 12 requests that a particular action be associated with a particular event. The adapter object can be unregistered when there are no longer any actions associated with the event to be performed.

Figure 5:
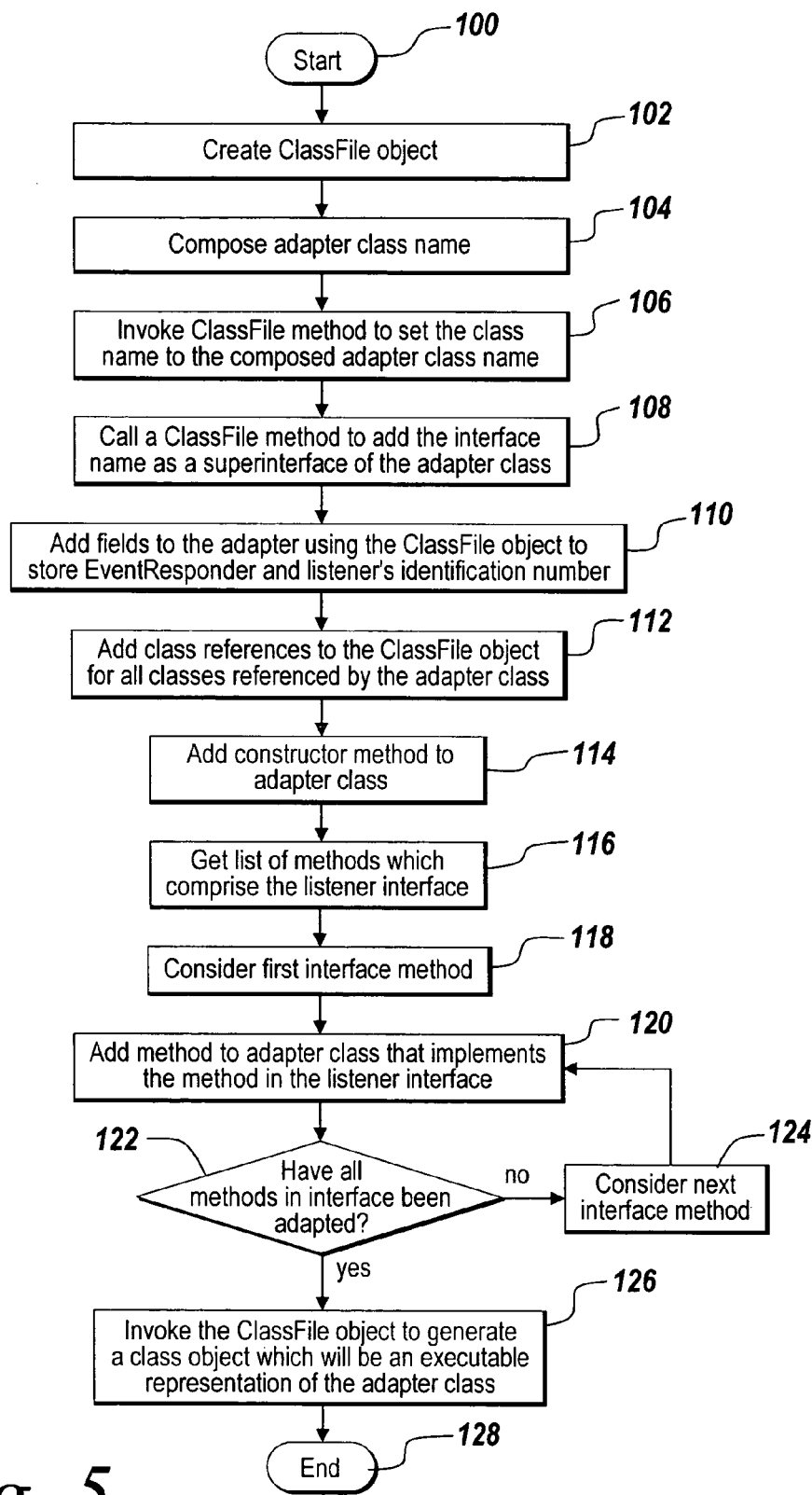
FIG. 5 is a flowchart illustrating a more detailed embodiment of a method in accordance with an embodiment of the invention.

FIG. 5 is a flow chart showing the steps taken in the object-oriented computing environment 20 after a caller in the interpretive environment 12 has requested registration with bean 36 in the external object-oriented computing environment 20. Again, for purposes of illustration, many of the concepts will be presented in terms of Java, but the concepts are not necessarily limited to the Java environment.

At the start 100, the program running in the interpretive computing environment 12 has encountered a user command to call a bean 36 in the object-oriented computing environment 20. The program running in the interpretive computing environment 12 has created a bean proxy 18, has assigned an identifier to the bean proxy, and has sent a message 40 to the native interface 24 identifying the bean 36 and an assigned identifier for the bean 36. In the object-oriented computing environment 20, the events and listener interfaces supported by the bean 36 have been found by introspection. For purposes of illustration, it will be assumed that the adapter table 28 has been consulted and that no adapter class implementing a particular interface yet exists. It is further assumed in FIG. 5 that the called bean class has only one listener interface, although multiple iterations of the steps shown in FIG. 5 may be performed for beans with multiple listener interfaces.

Within the adapter generator 50, the ClassFile class 52 is instantiated to create an object of the class ClassFile (102). This object of the class ClassFile may then be used to create a new adapter class. The new adapter class then may have its characteristics "filled in" by invoicing methods of this ClassFile object. Some self-descriptive methods (written in the Java language) supported by the class ClassFile may include:

void setName(String className)
    void addClassReference(String className)
    void addFieldReference(String className, String fieldName, String typeSignature)
    void addMethodReference(String className, String methodName, String signature)
    void addField(String name, String typeSignature, int accessFlags)
    void addMethod(String name, String signature, byte[ ] byteCodes, int accessFlags)
    void setSuperclass(String superclassName)
    void addImplementedInterface(String interfaceName)
    Class createClass( )

As the names of the above methods suggest, the methods may be used to build an adapter class essentially from scratch during runtime. The adapter class may be tailored to support a desired method or to work with desired data. Importantly, the adapter class is built at the intermediate bytecode level, not at the high-level Java source code level. By being built at the intermediate bytecode level, the adapter class bypasses the compiling process, and may be said to have been created "dynamically."

One characteristic the new adapter class may require is a name. Accordingly a name may be composed (104). Composing a name may be done in many ways. In the Java environment, one way to compose a name is to take the listener interface name and concatenate the word "Adapter" on the end. For example, the adapter class to implement the interface "MouseListener" may be named "MouseListenerAdapter." Obtaining the name of the interface by a standard Java API (application program interface) call may return a name in an undesirable format for use on the virtual machine 22 (such as including dot (.) characters instead of slash (/) characters), but the name can be easily converted to a usable format (such as by converting all dots to slashes). Once the name is fully composed, a ClassFile method (void setName(String className)) may be invoked to set the name of the new adapter class (106).

Another method may be called, by which the new adapter class will implement the listener interface (108). In other words, the listener interface is added as a superinterface of the new adapter class. In Java language, this step is accomplished by using the "implements" syntax, such as "MouseListenerAdapter implements MouseListener"; but the ClassFile object uses a method, rather than the Java language, to accomplish this step.

Other methods may be invoked to "fill in" more characteristics of the new adapter class. Fields may be added to the new adapter class to store information that the new adapter class will need at a later time, when the listener interface it implements is invoked (110). One field may store a pointer or reference to the Event Responder 54 in the object-oriented computing environment 20. When, at a later time, the bean fires its event and notifies the adapter of the event, the adapter will then relay this information to the Event Responder 54, and the pointer or reference is stored in the adapter so that the relay may be made. The new adapter class may therefore include fields for this pointer or reference.

The new adapter class may further include one or more fields to hold information to identify the event when an event is fired. A field could hold an identifier identifying which listener interface of the particular bean was triggered. Although each adapter class is expected to implement a single listener interface, this field may be useful if different beans map the same listener interface in different ways. For example, the listener interface MouseListener may be the first interface for a first bean, but the very same MouseListener interface may be the sixth interface for a second bean. When the adapter class is later instantiated to create an adapter object, the field may be used to map to the desired interface of the bean. The particular event triggered within the listener interface may be encoded within the adapter class's methods, as described below. The particular event is identified by a constant integer encoded in each of the adapter's methods that respond to an event. This integer may be passed to the Event Responder 54, along with the value in the field identifying the listener interface.

Further methods may be invoked to "fill in" more characteristics of the new adapter class. References to classes may be added for all classes referenced by the adapter class (112). For example, a Java class representation must have entries in its pool of constants for all classes (such as the java.lang.Object class or the EventResponder class) referenced by the class. Constants include names of methods, data types of methods, and so forth.

An additional method may be invoked to add an adapter class constructor method (114). In Java, a constructor is a special method that initializes the instance variables, when an instance of a class object is created, and a constructor is needed for all Java classes. The actual adapter class constructor method may be written in bytecodes passed into the ClassFile object by a method executed within the adapter generator, and may simply call another constructor, such as the constructor for java.lang.Object.

In the following steps (118, 120, 122, 124), methods are invoked to add methods to the new adapter class, one method in the new adapter class for each method in the listener interface. A method and its signature (a combination of the method's name and its parameter types) may be found by introspection. In Java, the added methods must have the same name and signature as those found by introspection. Adding a method (120) may involve the adapter generator providing the ClassFile object with each method's name, signature and bytecodes. The adapter generator gives each adapter class method bytecodes that cause the method to invoke the EventResponder class, and pass down: the listener identifier, the event number; all of the arguments passed to the listener method, bundled in an array of java.lang.Object objects; and any additional information stored in the adapter class. The bytecodes shown below represent an illustrative, and non-unique, implementation of the invention:

| Bytecode (Hex) | Meaning |
| --- | --- |
| 2a | load the object pointer "this" onto the operand stack |
| 2b | push first parameter onto the stack—this is the event data object. |
| 10 | push integer byte onto the stack. |
| XX | An integer from 0-255 representing the index of the method within the listener interface. This integer identifies the particular event triggered within the listener interface. |
| b7 | invoke a class method—this is the method which invokes the Event Responder |
| XX | Fill in this bytecode (and the one that follows) with 2 bytes that form a 16-bit integer which represents the constant pool index of the method being invoked at runtime. |
| XX | |
| b1 | return |

Various embodiments have been described of a method and system by which a computer program operating in a one computing environment may utilize objects in an external object-oriented computing environment. The invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable within an computing environment of a computer including at least one programmable processor coupled to receive data and instructions from, and to transmit data and instructions to, a data storage system, at least one input device, and at least one output device.

Figure 6:
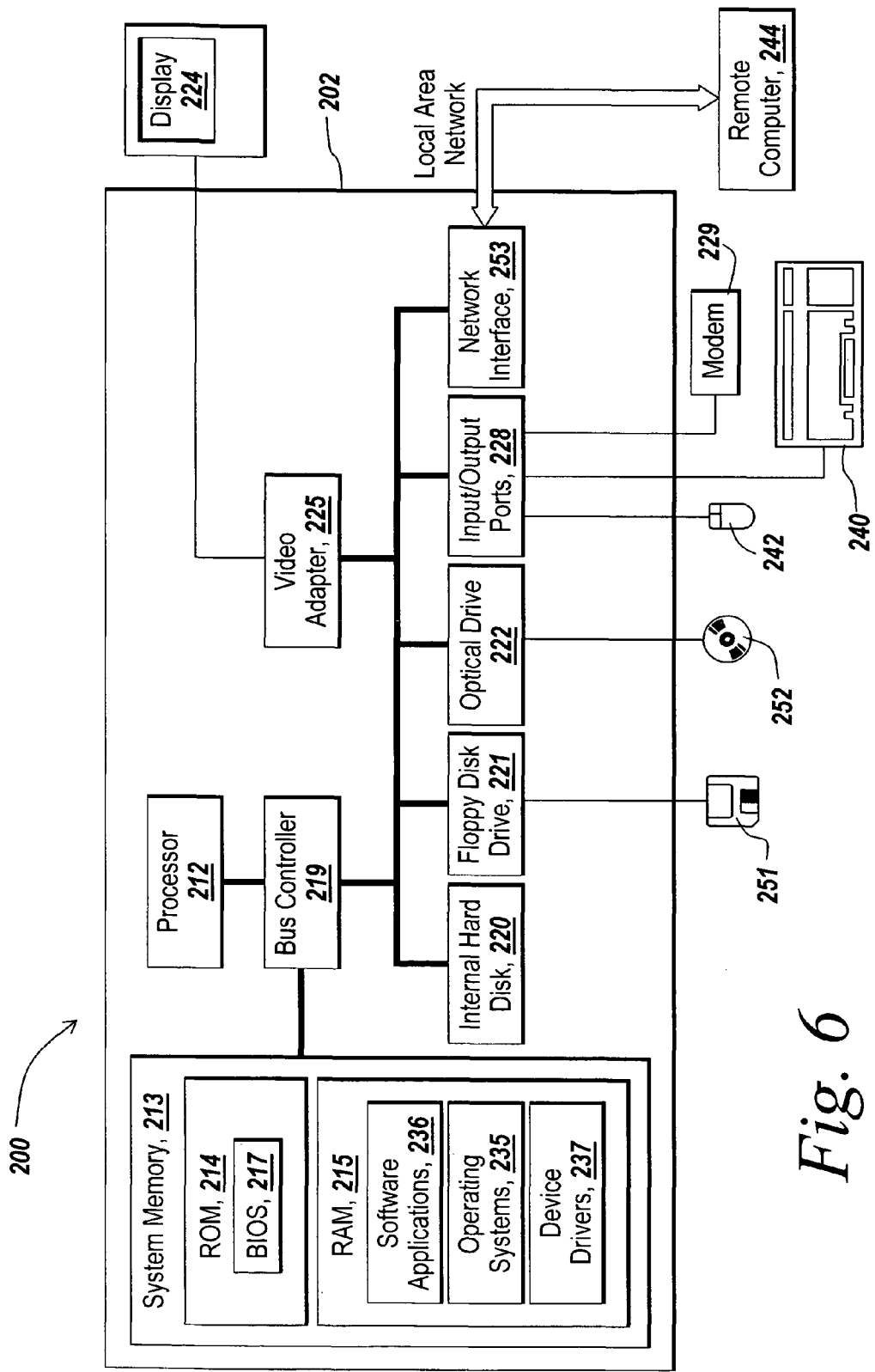
FIG. 6 is a block diagram illustrating a programmable processing system suitable for implementing and performing the system and methods of the invention.

An example of one such type of computer is shown in FIG. 6, which shows a block diagram of a programmable processing system (system) 200 suitable for implementing or performing the apparatus or methods of the invention. As shown in FIG. 6, the system 200 includes a processor 212 that in one implementation belongs to the PENTIUM® family of microprocessors manufactured by the Intel Corporation of Santa Clara, Calif. However, it should be understood that the invention can be implemented on computers based upon other microprocessors, such as the MIPS® family of microprocessors from the Silicon Graphics Corporation, the POWERPC® family of microprocessors from both the Motorola Corporation and the IBM Corporation, the PRECISION ARCHITECTURE® family of microprocessors from the Hewlett-Packard Company, the SPARC® family of microprocessors from the Sun Microsystems Corporation, or the ALPHA® family of microprocessors from the Compaq Computer Corporation. System 200 represents any server, personal computer, laptop or even a battery-powered, pocket-sized, mobile computer known as a hand-held PC or personal digital assistant (PDA).

System 200 includes system memory 213 including read only memory (ROM) 214 and random access memory (RAM) 215, which is connected to the processor 212 by a system data/address bus 216. ROM 214 represents any device that is primarily read-only including electrically erasable programmable read-only memory (EEPROM), flash memory, etc. RAM 215 represents any random access memory such as Synchronous Dynamic Random Access Memory.

Within the system 200, input/output bus 218 is connected to the data/address bus 216 via bus controller 219. In one implementation, input/output bus 218 is implemented as a standard Peripheral Component Interconnect (PCI) bus. The bus controller 219 examines all signals from the processor 212 to route the signals to the appropriate bus. Signals between the processor 212 and the system memory 213 are merely passed through the bus controller 219. However, signals from the processor 212 intended for devices other than system memory 213 are routed onto the input/output bus 218.

Various devices are connected to the input/output bus 218 including hard disk drive 220, floppy drive 221 that is used to read floppy disk 251, and optical drive 222, such as a CD-ROM drive that is used to read an optical disk 252. The video display 224 or other kind of display device is connected to the input/output bus 218 via a video adapter 225.

Users enter commands and information into the system 200 by using a keyboard 240 and/or pointing device, such as a mouse 242, which are connected to bus 218 via input/output ports 228. Other types of pointing devices (not shown in FIG. 6) include track pads, track balls, joysticks, data gloves, head trackers, and other devices suitable for positioning a cursor on the video display 224.

As shown in FIG. 6, the system 200 also includes a modem 229. Although illustrated in FIG. 6 as external to the system 200, those of ordinary skill in the art will quickly recognize that the modem 229 may also be internal to the system 200. The modem 229 is typically used to communicate over wide area networks (not shown), such as the global Internet. Modem 229 may be connected to a network using either a wired or wireless connection.

Software applications 236 and data are typically stored via one of the memory storage devices, which may include the hard disk 220, floppy disk 251, CD-ROM 252 and are copied to RAM 215 for execution. In one implementation, however, software applications 236 are stored in ROM 214 and are copied to RAM 215 for execution or are executed directly from ROM 214.

In general, the operating system 235 executes software applications 236 and carries out instructions issued by the user. For example, when the user wants to load a software application 236, the operating system 235 interprets the instruction and causes the processor 212 to load software application 236 into RAM 215 from either the hard disk 220 or the optical disk 252. Once one of the software applications 236 is loaded into the RAM 215, it can be used by the processor 212. In case of large software applications 236, processor 212 loads various portions of program modules into RAM 215 as needed.

The Basic Input/Output System (BIOS) 217 for the system 200 is stored in ROM 214 and is loaded into RAM 215 upon booting. Those skilled in the art will recognize that the BIOS 217 is a set of basic executable routines that have conventionally helped to transfer information between the computing resources within the system 200. Operating system 235 or other software applications 236 use these low-level service routines. In one implementation system 200 includes a registry (not shown) that is a system database that holds configuration information for system 200. For example, the Windows® operating system by Microsoft Corporation of Redmond, Wash., maintains the registry in two hidden files, called USER.DAT and SYSTEM.DAT, located on a permanent storage device such as an internal disk.

The invention has been described in terms of particular embodiments. Other embodiments are within the scope of the following claims. This application is intended to cover any adaptation or variation of the present invention. It is intended that this invention be limited only by the claims and equivalents thereof.

We claim:

1. A computer-implemented method for accessing an object in an object-oriented programming environment, the object written in a first object-oriented programming language, the method comprising:
   executing a program written in a second programming language in a second environment external to the object-oriented programming environment, the execution of the program identifying an object in the object-oriented programming environment;
   introspecting an object class for the identified object during the execution of the program in the second environment to determine at least one interface supported by the identified object;
   creating an adaptor class in the object oriented programming environment during the execution of the program in the second environment, the creating of the adaptor class being based on a result of the introspection, the creating including an adding of bytecode to an adaptor class definition in the object-oriented programming environment, the adaptor class implementing an interface supported by the class of the identified object;
   instantiating an object of the adaptor class in the object oriented programming environment without first compiling the adaptor class;
   creating, in the second environment, a proxy for the identified object; and
   establishing communication between the identified object written in the first object-oriented language and the program written in the second programming language via the interface in the adaptor object.

2. The computer-implemented method of claim 1, wherein the first object-oriented programming language is Java and the second programming language is a non-Java programming language.

3. The computer-implemented method of claim 2, wherein the implemented interface is defined by a Java bean.

4. The computer-implemented method of claim 2, wherein the second programming language is at least one or a combination of: C, C++, and Perl.

5. The computer-implemented method of claim 2, wherein the second programming language is an interpreted language.

6. The computer-implemented method of claim 2, further comprising:
   identifying, from the program written in the second language, a Java object, wherein the adaptor class implements the interface of the identified object.

7. The computer-implemented method of claim 6 wherein the instantiated adaptor object is instantiated as a function of the adaptor class in the Java programming language.

8. The computer-implemented method of claim 1, wherein at least a subset of the second programming language comprises MATLAB-compatible commands.

9. The computer-implemented method of claim 1, further comprising:
receiving, by the instantiated adaptor object, a message concerning an event.

10. The computer-implemented method of claim 9, further comprising:
scheduling a message concerning the event to the objected oriented programming environment.

11. A computer-implemented system comprising:
a physical computing device executing:
a computing environment executing a program written in a non-Java programming language, the execution of the program identifying a Java object in a Java-based computing environment external to the computing environment executing the program written in the non-Java programming language, the system:
introspecting an object class for the identified Java object during execution of the program in the computing environment to determine at least one interface supported by the identified Java object;
the Java-based computing environment creating during the execution of the program an adaptor class, the creating of the adaptor class including an adding of bytecode to an adaptor class definition in the Java-based computing environment, the adaptor class implementing a Java interface supported by a class of the identified object, an object of the adaptor class being instantiated in the Java-based environment without first compiling the adaptor class, wherein: a proxy for the identified object is created in the computing environment and communication is established between the identified object and the program via the interface in the adaptor object.

12. The computer-implemented system of claim 11, wherein at least a subset of the non-Java programming language comprises MATLAB-compatible commands.

13. The computer-implemented system of claim 11, wherein the non-Java programming language is at least one or a combination of: C, C++ and Perl.

14. The computer-implemented system of claim 11, wherein the non-Java programming language is an interpreted programming language.

15. The computer-implemented system of claim 11, wherein the implemented Java interface is defined by a Java bean.

16. The computer-implemented system of claim 15, further comprising an event responder in the interface defined by the Java bean.

17. The computer-implemented system of claim 15, further comprising an event queue in the interface defined by the Java bean.

18. The computer-implemented system of claim 11, further comprising:
a compiled bean class in the Java-based computing environment.

19. The computer-implemented system of claim 18, further comprising:
a bean object instantiated from the compiled bean class.

20. The computer-implemented system of claim 11, wherein the adaptor class is stored in a cache.

21. The computer-implemented system of claim 20, wherein the cache is used for a second invocation.

22. The computer-implemented system of claim 11, further comprising:
a native interface in the Java-based computing environment, the native interface capable of receiving instructions and data from the computing environment executing the program written in the non-Java programming language.

23. A non-transitory computer-readable storage medium holding computer-executable instructions for accessing an object in an object-oriented programming environment, the object written in a first object-oriented programming language, the instructions when executed causing at least one computing device to:
execute a program written in a second programming language in a second environment external to the object-oriented programming environment, the execution of the program identifying an object in the object-oriented programming environment; and
introspecting an object class for the identified object during the execution of the program in the second environment to determine at least one interface supported by the identified object;
creating an adaptor class in the object oriented programming environment during the execution of the program in the second environment, the creating of the adaptor class being based on a result of the introspection, the creating including an adding of bytecode to an adaptor class definition in the object-oriented programming environment, the adaptor class implementing an interface supported by the class of the identified object;
instantiating an object of the adaptor class in the object oriented programming environment without first compiling the adaptor class;
creating, in the second environment, a proxy for the identified object; and
establishing communication between the identified object written in the first object-oriented language and the program written in the second programming language via the interface in the adaptor object.

24. The computer-readable medium of claim 23, wherein the first object-oriented programming language is Java and the second programming language is a non-Java programming language.

25. The computer-readable medium of claim 24, wherein the implemented interface supported by the class of the identified object is defined by a Java bean.

26. The computer-readable medium of claim 23, wherein at least a subset of the second programming language comprises MATLAB-compatible commands.

27. A computer-implemented system for accessing an object in an object-oriented programming environment, said system comprising:
a physical computing device including:
means for executing a program written in a second programming language in a second environment external to the object-oriented programming environment, the execution of the program identifying an object in the object-oriented programming environment; and
means for introspecting an object class for the identified object during the execution of the program in the second environment to determine at least one interface supported by the identified object;
means for creating an adaptor class in the object oriented programming environment during the execution of the program in the second environment, the creating of the adaptor class being based on a result of the introspection, the creating including an adding of bytecode to an adaptor class definition in the object-oriented programming environment, the adaptor class implementing an interface supported by the class of the identified object;

means for instantiating an object of the adaptor class in the object oriented programming environment without first compiling the adaptor class;

means for creating, in the second environment, a proxy for the identified object; and means for establishing communication between the identified object written in the first object-oriented language and the program written in the second programming language via the interface in the adaptor object.

28. The computer-implemented system of claim 27, wherein the first object-oriented programming language is Java and the second programming language is a non-Java programming language.

29. The computer-implemented system of claim 28, wherein the interface supported by the class of the identified object is defined by a Java bean.

30. The computer-implemented system of claim 27, wherein at least a subset of the second programming language comprises MATLAB-compatible commands.

* * * * *